United States Patent
Chiang et al.

(10) Patent No.: US 8,847,873 B2
(45) Date of Patent: Sep. 30, 2014

(54) GATE LINE DRIVING MODULE FOR LIQUID CRYSTAL DISPLAY AND LIQUID CRYSTAL DISPLAY USING THE SAME

(75) Inventors: Chien-Hsueh Chiang, Miao-Li County (TW); Sz-Hsiao Chen, Miao-Li County (TW)

(73) Assignee: InnoLux Corporation (TW)

( * ) Notice: Subject to any disclaimer, the term of this patent is extended or adjusted under 35 U.S.C. 154(b) by 853 days.

(21) Appl. No.: 12/826,594

(22) Filed: Jun. 29, 2010

(65) Prior Publication Data

US 2011/0007064 A1 Jan. 13, 2011

(30) Foreign Application Priority Data

Jul. 9, 2009 (CN) .......................... 2009 1 0304184

(51) Int. Cl.
  *G09G 3/36* (2006.01)
  *G08C 19/16* (2006.01)
  *G09G 3/32* (2006.01)
  *G02F 1/1345* (2006.01)

(52) U.S. Cl.
  CPC .......... *G09G 3/3674* (2013.01); *G09G 2330/02* (2013.01); *G02F 1/13454* (2013.01); *G02F 2202/103* (2013.01); *G09G 2320/043* (2013.01); *G09G 2310/0286* (2013.01); *G09G 2310/0278* (2013.01); *G09G 3/3677* (2013.01); *G09G 2330/06* (2013.01); *G09G 3/3266* (2013.01); *G09G 2300/0408* (2013.01)
  USPC ........................................ 345/100; 340/12.21

(58) Field of Classification Search
  CPC .................... G09G 3/3674; G09G 2310/0286; G09G 3/3677; G09G 2310/0278; G09G 3/3266; G11C 19/00; G11C 27/00; G11C 19/287; G11C 19/38; G11C 27/04; G11C 29/20
  USPC ..................... 345/100; 315/169.2; 340/12.21; 377/64–81
  See application file for complete search history.

(56) References Cited

U.S. PATENT DOCUMENTS

| | | | |
|---|---|---|---|
| 7,027,550 | B2 | 4/2006 | Lin |
| 7,446,570 | B2 | 11/2008 | Lee et al. |
| 2006/0061562 | A1 * | 3/2006 | Park et al. ...................... 345/204 |
| 2008/0042950 | A1 * | 2/2008 | Park et al. ........................ 345/87 |
| 2010/0156474 | A1 * | 6/2010 | Park et al. ...................... 327/108 |

* cited by examiner

*Primary Examiner* — Dwayne Bost
*Assistant Examiner* — Christopher Kohlman
(74) *Attorney, Agent, or Firm* — Bacon & Thomas, PLLC (57) ABSTRACT

A gate line driving module used on a liquid crystal display uses clock signal sources in replacement of a high level gate power source, such that the phenomenon of device characteristic drift occurring in the foregoing related art is avoided. The gate line driving module includes a plurality of odd-pixel gate line driving circuits, a plurality of even-pixel gate line driving circuits, and an auxiliary gate line driving circuit. A pair of neighboring odd-pixel gate line driving circuit and even-pixel gate line driving circuit exchange output signals thereof with each other in a forward or feedback manner for ensuring that each the odd-pixel gate line driving circuit and each the even-pixel gate line driving circuit are driven once. The auxiliary gate line driving circuit is used for ensuring that signal iteration of the gate line driving module is under normal operation.

18 Claims, 6 Drawing Sheets

GATE LINE DRIVING MODULE FOR LIQUID CRYSTAL DISPLAY AND LIQUID CRYSTAL DISPLAY USING THE SAME

BACKGROUND OF THE DISCLOSURE

1. Field of the Disclosure

The disclosure relates to a gate line driving module for a liquid crystal display (LCD), and more particularly, the disclosure relates to a gate line driving module and an LCD which use clock signals to serve as a high level gate power source.

2. Description of Related Art

Figure 1:
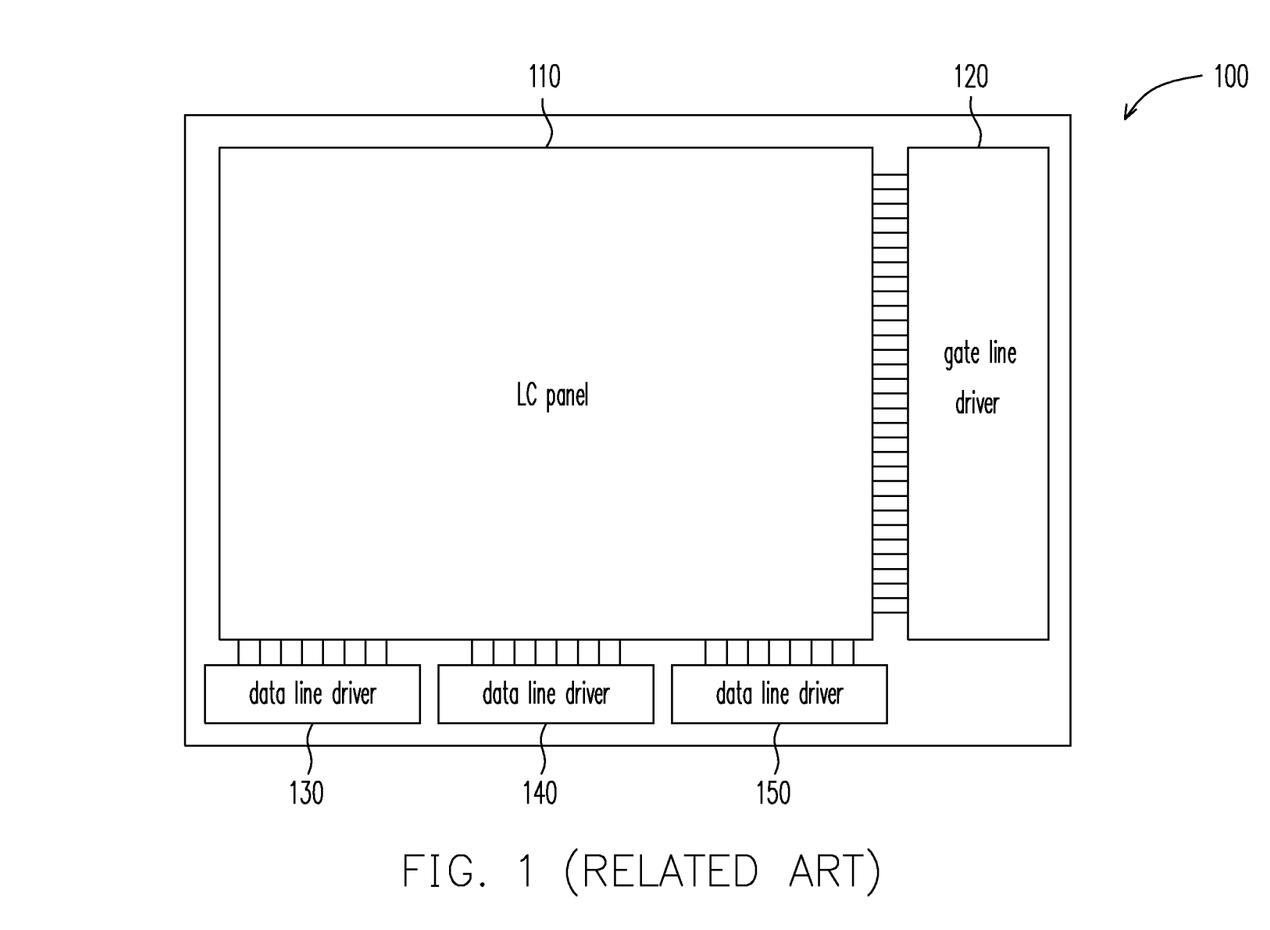
FIG. 1 is a schematic view of a typical TFT-LCD.

FIG. 1 is a schematic view of a typical thin film transistor liquid crystal display (TFT-LCD) 100. As shown in FIG. 1, the TFT-LCD 100 includes a liquid crystal (LC) panel 110, a gate line driver 120, and a plurality of data line drivers 130, 140, and 150. The gate line driver 120 and the data line drivers 130, 140, and 150 drive corresponding thin film transistors (TFTs) on the LC panel 110. In order to reduce the cost of manufacturing TFT-LCDs, it is currently considered that the gate line driver and the LC panel are fabricated on the glass substrate in an identical process. By such a manner, the cost of additionally disposing the gate line driver on the LCD and the area of the integrated circuit are both saved.

However, fabricating the gate line driver on the glass substrate in the amorphous silicon process has the limitation of which the gate line driver is simply implemented by N-type TFTs. As a result, a high level gate power source of the gate line driver must be supplied, such that the switch states of the internal switches are determined. However, the electron mobility of amorphous silicon is relatively low, width to length (W/L) ratios of the N-type TFTs adopted in the gate line driver must be relatively high to offset the low electron mobility of amorphous silicon. As a result, internal parasitic capacitance of the gate line driver is increased, such that the phenomenon of coupling between internal signals of the gate line driver is easily generated due to the increase of the parasitic capacitance. Accordingly, the output signals of the gate line driver creates a ripple effect, such that the display quality of the LC panel is affected. Furthermore, in the gate line driver, the N-type TFTs which are affected by bias over a long period of time have the phenomenon of device characteristic drift, so as to affect the operation of the gate line driver.

SUMMARY OF THE DISCLOSURE

An exemplary embodiment of the disclosure provides a gate line driving module for a liquid crystal display (LCD). The gate line driving module includes a plurality of odd-pixel gate line driving circuits, a plurality of even-pixel gate line driving circuits, and an auxiliary gate line driving circuit. A signal input source is coupled to a signal input end of a first-stage odd-pixel gate line driving circuit of the odd-pixel gate line driving circuits or a signal input end of a first-stage even-pixel gate line driving circuit of the even-pixel gate line driving circuits, and the signal input source is also coupled to a signal feedback end of the auxiliary gate line driving circuit. A first clock signal source is coupled to a first clock signal input end of each of the odd-pixel gate line driving circuits, a first clock signal input end of each of the even-pixel gate line driving circuits, and a first clock signal input end of the auxiliary gate line driving circuit. A second clock signal source is coupled to a second clock signal input end of each of the odd-pixel gate line driving circuits, a second clock signal input end of each of the even-pixel gate line driving circuits, and a second clock signal input end of the auxiliary gate line driving circuit. The first clock signal source and the second clock signal source are inverted from each other. The first clock signal source and the second clock signal source serve as a high level gate power source of the odd-pixel gate line driving circuits, the even-pixel gate line driving circuits, or the auxiliary gate line driving circuit. Transistors of the odd-pixel gate line driving circuits, the even-pixel gate line driving circuits, and the auxiliary gate line driving circuit are N-type thin film transistors (TFTs). The gate line driving module is fabricated with a liquid crystal (LC) panel of the LCD in an identical amorphous silicon process.

Another exemplary embodiment of the disclosure provides an LCD. The LCD includes a plurality of data line driving circuits and an LC panel module. The LC panel module includes an LC panel and a gate line driving module. The gate line driving module includes a plurality of odd-pixel gate line driving circuits, a plurality of even-pixel gate line driving circuits, and an auxiliary gate line driving circuit. The gate line driving module and the data line driving circuits drive corresponding TFTs on the LC panel. A signal input source is coupled to a signal input end of a first-stage odd-pixel gate line driving circuit of the odd-pixel gate line driving circuits or a signal input end of a first-stage even-pixel gate line driving circuit of the even-pixel gate line driving circuits. The signal input source is also coupled to a signal feedback end of the auxiliary gate line driving circuit. A first clock signal source is coupled to a first clock signal input end of each of the odd-pixel gate line driving circuits, a first clock signal input end of each of the even-pixel gate line driving circuits, and a first clock signal input end of the auxiliary gate line driving circuit. A second clock signal source is coupled to a second clock signal input end of each of the odd-pixel gate line driving circuits, a second clock signal input end of each of the even-pixel gate line driving circuits, and a second clock signal input end of the auxiliary gate line driving circuit. The first clock signal source and the second clock signal source are inverted from each other. The first clock signal source and the second clock signal source serve as a high level gate power source of the odd-pixel gate line driving circuits, the even-pixel gate line driving circuits, or the auxiliary gate line driving circuit. Transistors of the odd-pixel gate line driving circuits, the even-pixel gate line driving circuits, and the auxiliary gate line driving circuit are N-type thin film transistors (TFTs). The gate line driving module is fabricated with a liquid crystal (LC) panel of the LCD in an identical amorphous silicon process.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 2:
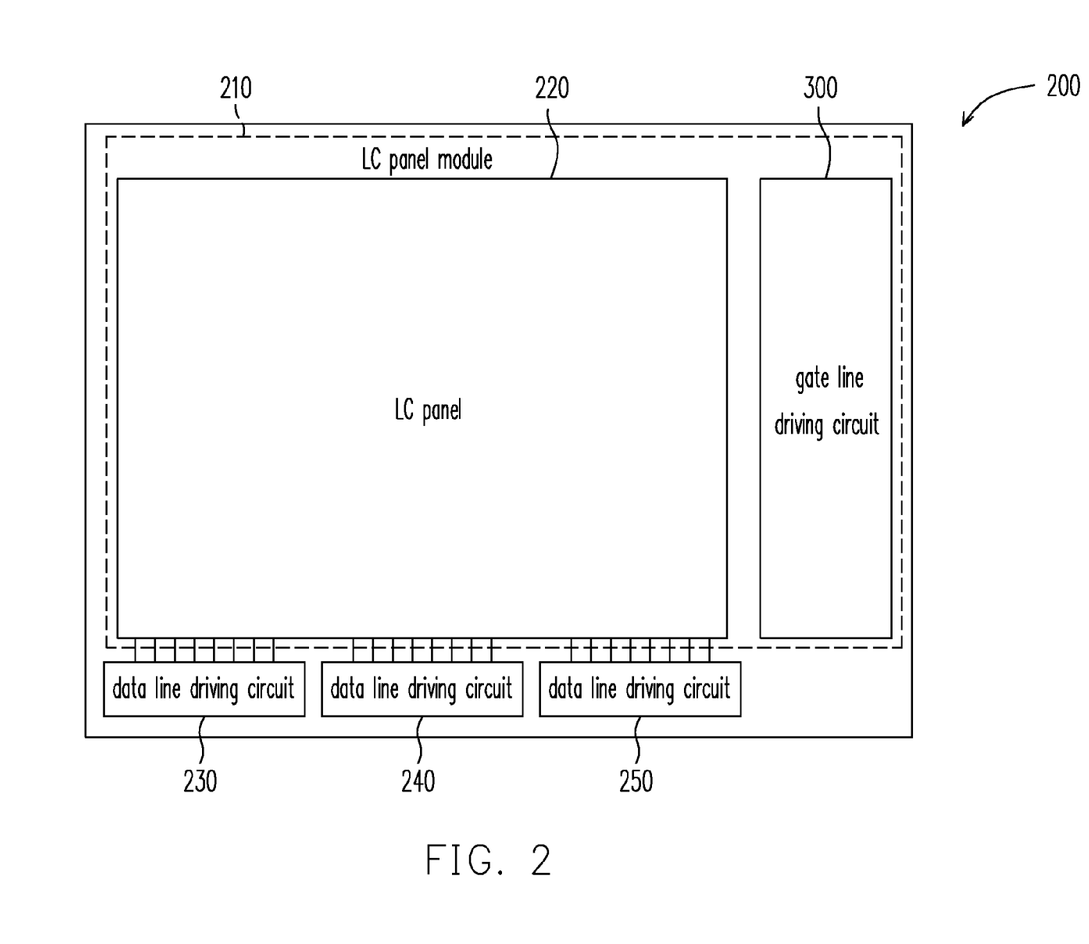
FIG. 2 is a schematic diagram of a TFT-LCD using a gate line driving module according to an embodiment of the disclosure.

FIG. 2 is a schematic diagram of a TFT-LCD 200 using a gate line driving module 300 according to an embodiment of the disclosure. As shown in FIG. 2, the TFT-LCD 200 includes a liquid crystal (LC) panel module 210 and a plurality of data line driving circuits 230, 240, and 250. The LC panel module 210 includes an LC panel 220 and the gate line driving module 300. The LC panel 220 and the gate line driving module 300 are fabricated into the LC panel module 210 in an identical (or substantially similar) amorphous silicon process.

Figure 3:
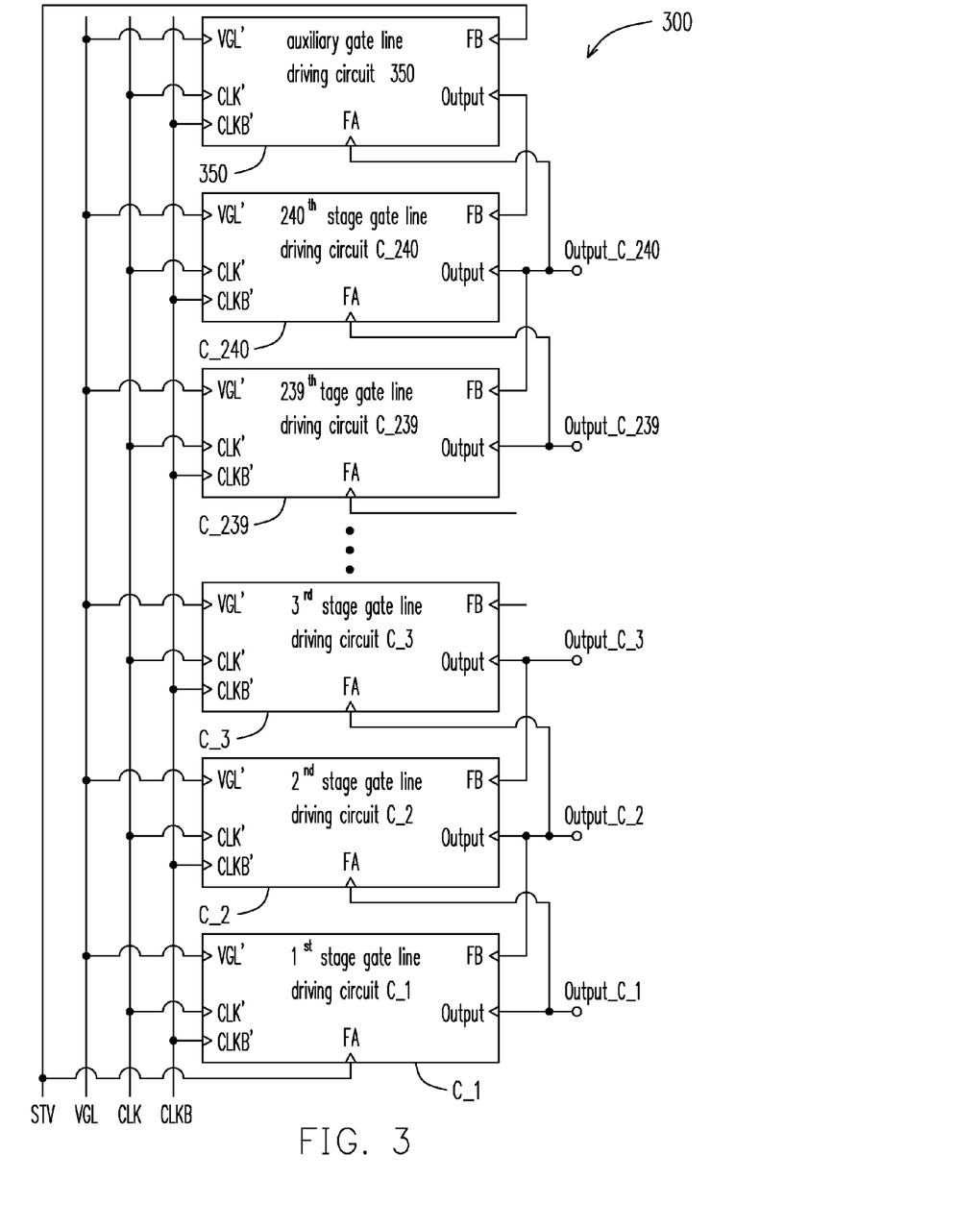
FIG. 3 is a schematic diagram of the gate line driving module according to an embodiment of the disclosure.

FIG. 3 is a schematic diagram of the gate line driving module 300 according to an embodiment of the disclosure. As shown in FIG. 3, the gate line driving module 300 has 240 gate line driving circuits including a $1^{st}$ stage gate line driving circuit C_1, a $2^{nd}$ stage gate line driving circuit C_2, a $3^{rd}$ stage gate line driving circuit C_3, ..., a $239^{th}$ stage gate line driving circuit C_239, and a $240^{th}$ stage gate line driving circuit C_240 and an auxiliary gate line driving circuit 350. Herein, internal devices and physical wiring of the 240 gate line driving circuits and the auxiliary gate line driving circuit 350 are identical, and the difference thereof simply lies in the clock input sources or the signal input sources coupled thereto. In FIG. 3, it is assumed that the $odd^{th}$ stage gate line driving circuits, such as the $1^{st}$ stage gate line driving circuit C_1 and the $3^{rd}$ stage gate line driving circuit C_3, are odd-pixel gate line driving circuits, and also, it is assumed that the $even^{th}$ stage gate line driving circuits, such as the $2^{nd}$ stage gate line driving circuit C_2 and the $240^{th}$ stage gate line driving circuit C_240, are even-pixel gate line driving circuits. However, in other embodiments of the disclosure, the $odd^{th}$ stage gate line driving circuits may be the even-pixel gate line driving circuits, and the $even^{th}$ even stage gate line driving circuits may be the odd-pixel gate line driving circuits. In other words, in the gate line driving module 300 disclosed in the disclosure, except for the auxiliary gate line driving circuit, one of the two neighboring gate line driving circuits is the odd-pixel gate line driving circuit, and the other is the even-pixel gate line driving circuit.

In the gate line driving module 300 shown in FIG. 3, four different kinds of signal sources or power sources including a signal input source STV, a low level gate power source VGL, a positive clock signal source CLK, and a negative clock signal source CLKB are further used.

The signal input source STV is a start driving signal which is externally inputted and is directly inputted to a signal input end FA of a $1^{st}$ stage gate line driving circuit C_1 and a signal feedback end FB of the auxiliary gate line driving circuit 350.

The positive clock signal source CLK is coupled to a positive clock signal input end CLK' of the odd-pixel gate line driving circuits C_1, C_3, ..., and C_239, a positive clock signal input end CLK' of the even pixel gate line driving circuits C_2, C_4, ..., and C_240, and a positive clock signal input end CLK' of the auxiliary gate line driving circuit 350. The negative clock signal source CLKB is coupled to a negative clock signal input end CLKB' of the odd-pixel gate line driving circuits C_1, C_3, ..., and C_239, a negative clock signal input end CLKB' of the even pixel gate line driving circuits C_2, C_4, ..., and C_240, and a negative clock signal input end CLKB' of the auxiliary gate line driving circuit 350. The positive clock signal source CLK and the negative clock signal source CLKB are inverted from each other. That is, the phase difference thereof is 180 degrees. It should be noted that, the high levels of the positive clock signal source CLK and the negative clock signal source CLKB both approximate to the level of the high level gate power source used in the foregoing related art. Accordingly, the positive clock signal source CLK and the negative clock signal source CLKB can be used to start each of the gate line driving circuits of the gate line driving module 300.

The low level gate power source VGL is coupled to a low level gate power source input end VGL' of the odd-pixel gate line driving circuits C_1, C_3, ..., and C_239, a low level gate power source input end VGL' of the even pixel gate line driving circuits C_2, C_4, ..., and C_240, and a low level gate power source input end VGL' of the auxiliary gate line driving circuit 350.

Additionally, the configuration of signal input and output between each gate line driving circuit of the gate line driving module 300 adopts both of forward and feedback. Except for the $1^{st}$ stage gate line driving circuit C_1 and the auxiliary gate line driving circuit 350, a signal input end FA of each stage gate line driving circuit is coupled to a signal output end Output of the gate line driving circuit of the previous stage thereof, and a signal output end Output of each stage gate line driving circuit is coupled to a signal feedback end FB of the gate line driving circuit of the previous stage thereof. Accordingly, each of the gate line driving circuits forwards the output signal thereof to the gate line driving circuit of the next stage thereof and feeds back the output signal thereof to the gate line driving circuit of the previous stage thereof. However, because the $1^{st}$ stage gate line driving circuit C_1 has no the gate line driving circuit of the previous stage, the output signal of the $1^{st}$ stage gate line driving circuit C_1 is unnecessarily fed back to the gate line driving circuit of the absent previous stage thereof, and the output signal is simply forwarded to the gate line driving circuit C_2 of the next stage thereof.

Figure 4:
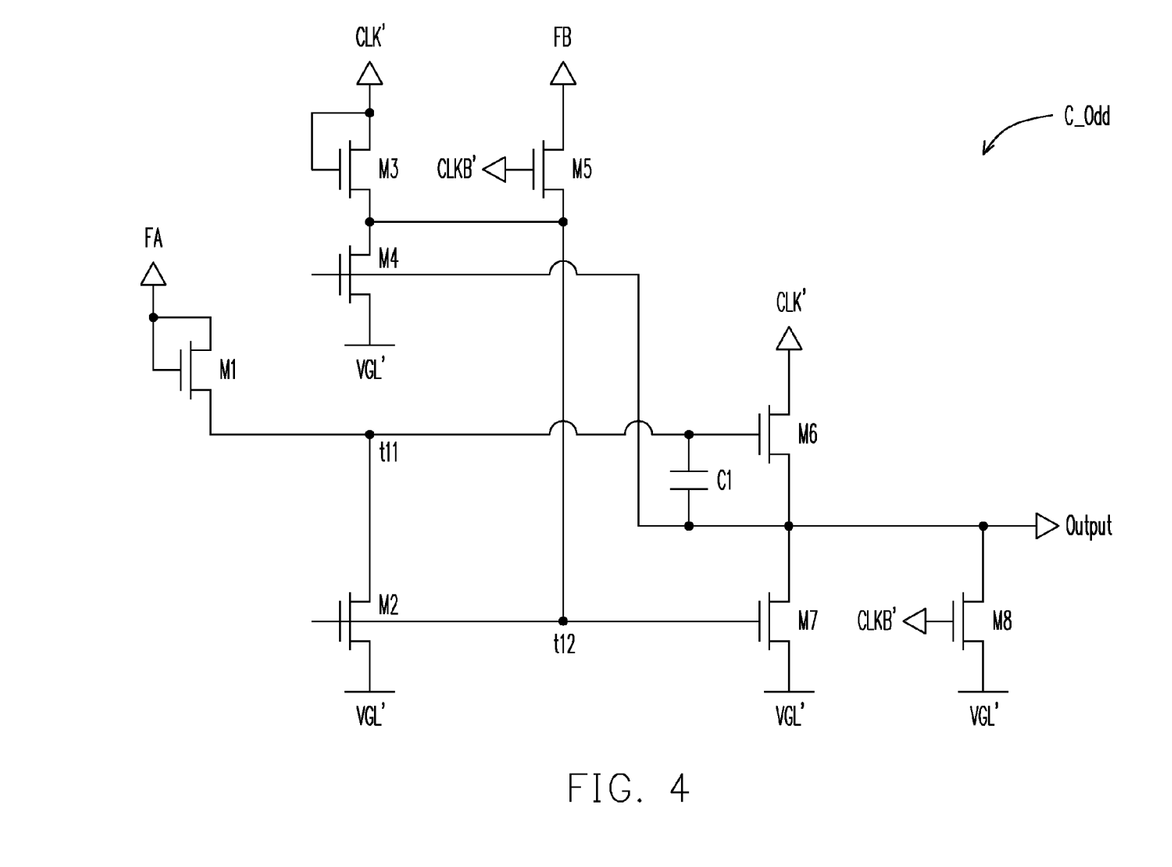
FIG. 4 illustrates a schematic circuit diagram which is implemented as one odd-pixel gate line driving circuit of the odd-pixel gate line driving circuits shown in FIG. 3.

FIG. 4 illustrates a schematic circuit diagram which is implemented as one odd-pixel gate line driving circuit C_Odd of the odd-pixel gate line driving circuits shown in FIG. 3. In other words, the odd-pixel gate line driving circuit C_Odd may be one of the odd-pixel gate line driving circuits C_1, C_3, ..., and C_239 shown in FIG. 3. As shown in FIG. 4, the odd-pixel gate line driving circuit C_Odd includes a $1^{st}$ N-type TFT M1, a $2^{nd}$ N-type TFT M2, a $3^{rd}$ N-type TFT M3, a $4^{th}$ N-type TFT M4, a $5^{th}$ N-type TFT M5, a $6^{th}$ N-type TFT M6, a $7^{th}$ N-type TFT M7, an $8^{th}$ N-type TFT M8, and a capacitor C1. The gate of the $1^{st}$ N-type TFT M1 is coupled to the drain of the $1^{st}$ N-type TFT M1. The drain of the $2^{nd}$ N-type TFT M2 is coupled to the source of the $1^{st}$ N-type TFT M1. The gate of the $3^{rd}$ N-type TFT M3 is coupled to the drain of the $3^{rd}$ N-type TFT M3. The source of the $3^{rd}$ N-type TFT M3 is coupled to the gate of the $2^{nd}$ N-type TFT M2. The drain of the $4^{th}$ N-type TFT M4 is coupled to the source of the $3^{rd}$ N-type TFT M3. The source of the $5^{th}$ N-type TFT M5 is coupled to the gate of the $2^{nd}$ N-type TFT M2. The gate of the $6^{th}$ N-type TFT M6 is coupled to the source of the $1^{st}$ N-type TFT M1. The source of the $6^{th}$ N-type TFT M6 is coupled to the gate of the $4^{th}$ N-type TFT M4. The gate of the $7^{th}$ N-type TFT M7 is coupled to the gate of the $2^{nd}$ N-type TFT M2. The drain of the $7^{th}$ N-type TFT M7 is coupled to the source of the $6^{th}$ N-type TFT M6. The drain of the $8^{th}$ N-type TFT M8 is coupled to the source of the $6^{th}$ N-type TFT M6. The first end of the capacitor C1 is coupled to the gate of the $6^{th}$ N-type TFT. The second end of the capacitor C1 is coupled to the source of the $6^{th}$ N-type TFT.

When the odd-pixel gate line driving circuit C_Odd shown in FIG. 4 is the $1^{st}$ stage gate line driving circuit C_1, the signal input source STV is coupled to the drain of the 1st N-type TFT M1. However, when the odd-pixel gate line driving circuit C_Odd shown in FIG. 4 is the other stage gate line driving circuit, e.g. C_3, instead of the 1st stage gate line driving circuit C_1, the signal end coupled to the drain of the 1st N-type TFT M1 is the signal output end Output of the even-pixel gate line driving circuit of the previous stage thereof, e.g. C_2. In other words, in each of the odd-pixel gate line driving circuits, the drain of the 1st N-type TFT M1 is coupled to the signal input end FA of the odd-pixel gate line driving circuit.

In the odd-pixel gate line driving circuit C_Odd shown in FIG. 4, the positive clock signal input end CLK' is coupled to the drain of the 3rd N-type TFT M3 and the drain of the 6th N-type TFT M6, and the negative clock signal input end CLKB' is coupled to the gate of the 5th N-type TFT M5 and the gate of the 8th N-type TFT M8.

In the odd-pixel gate line driving circuit C_Odd shown in FIG. 4, the low level gate power source input end VGL' is coupled to the source of the 2nd N-type TFT M2, the source of the 4th N-type TFT M4, the source of the 7th N-type TFT M7, and the source of the 8th N-type TFT M8.

In the odd-pixel gate line driving circuit C_Odd shown in FIG. 4, the signal output end Output thereof is coupled to the drain of the 8th N-type TFT M8, and the signal feedback end FB thereof is coupled to the drain of the 5th N-type TFT M5.

Figure 5:
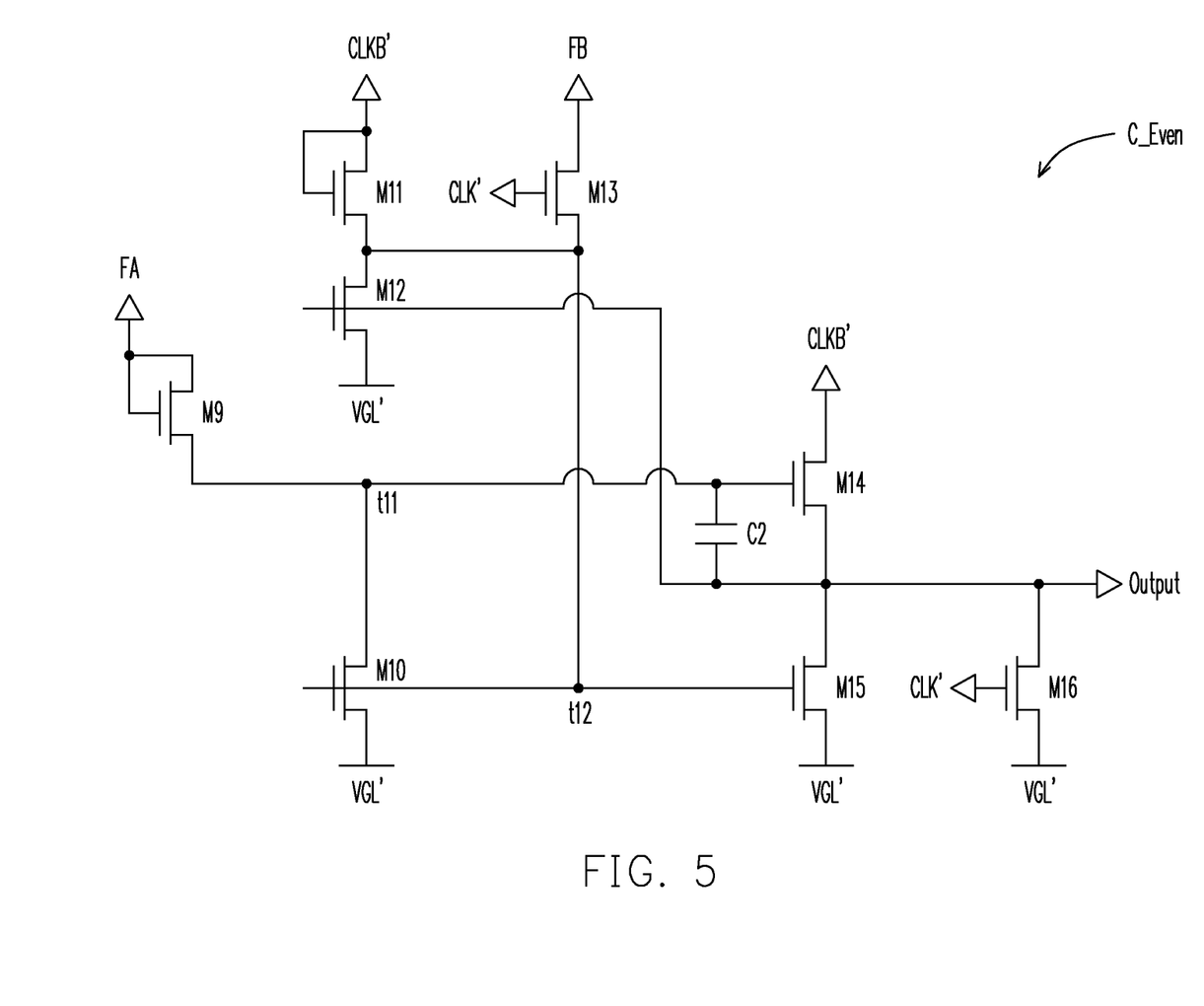
FIG. 5 illustrates a schematic circuit diagram which is implemented as one even-pixel gate line driving circuit of the odd-pixel gate line driving circuits shown in FIG. 3.

FIG. 5 illustrates a schematic circuit diagram which is implemented as one even-pixel gate line driving circuit C_Even of the odd-pixel gate line driving circuits shown in FIG. 3. In other words, the even-pixel gate line driving circuit C_Even may be one of the even-pixel gate line driving circuits C_2, C_4, . . . , and C_240 shown in FIG. 3. As shown in FIG. 5, the even-pixel gate line driving circuit C_Even includes a 9th N-type TFT M9, a 10th N-type TFT M10, a 11th N-type TFT M11, a 12th N-type TFT M12, a 13th N-type TFT M13, a 14th N-type TFT M14, a 15th N-type TFT M15, a 16th N-type TFT M16, and a capacitor C2. It should be noted that, the 9th N-type TFT M9 corresponds to the 1st N-type TFT M1, the 10th N-type TFT M10 corresponds to the 2nd N-type TFT M2, the 11th N-type TFT M11 corresponds to the 3rd N-type TFT M3, the 12th N-type TFT M12 corresponds to the 4th N-type TFT M4, the 13th N-type TFT M13 corresponds to the 5th N-type TFT M5, the 14th N-type TFT M14 corresponds to the 6th N-type TFT M6, the 15th N-type TFT M15 corresponds to the 7th N-type TFT M7, the 16th N-type TFT M16 corresponds to the 8th N-type TFT M8, and the capacitor C2 corresponds to the capacitor C1. The connection between each device shown in FIG. 5 corresponds to that between each device shown in FIG. 4, and thus, it will not be described again herein. It should be noted that, the difference of the even-pixel gate line driving circuit C_Even and the odd-pixel gate line driving circuit C_Odd lies in that the positions coupled to the positive clock signal end CLK' and the negative clock signal end CLKB' are opposite. For example, in FIG. 5, the positive clock signal end CLK' is coupled to the gate of the 13th N-type TFT M13 and the gate of the 16th N-type TFT M16, and the negative clock signal end CLKB' is coupled to the drain of the 11th N-type TFT M11 and the drain of the 14th N-type TFT M14.

When the 240th stage gate line driving circuit C_240 is an odd-pixel gate line driving circuit, the configuration and the signal connection of the auxiliary gate line driving circuit 350 are the same as those of the even-pixel gate line driving circuit C_Even shown in FIG. 5. When the 240th stage gate line driving circuit C_240 is an even-pixel gate line driving circuit, the configuration and the signal connection of the auxiliary gate line driving circuit 350 are the same as those of the odd-pixel gate line driving circuit C_Odd shown in FIG. 4. Accordingly, the configuration and the signal connection of the auxiliary gate line driving circuit will not be described again herein. The functions of the auxiliary gate line driving circuit 350 are to receive the output signal of the 240th stage gate line driving circuit C_240 by the signal input end FA thereof, to feed back the output signal thereof to the 240th stage gate line driving circuit C_240, and to forward the output signal thereof to the 1st stage gate line driving circuit C_1. In other words, the function of the auxiliary gate line driving circuit 350 is to serve as a dummy gate line driving circuit to maintain the normal operation of the gate line driving module 300. That is, the auxiliary gate line driving circuit 350 is not used to drive any gate line in fact.

Figure 6:
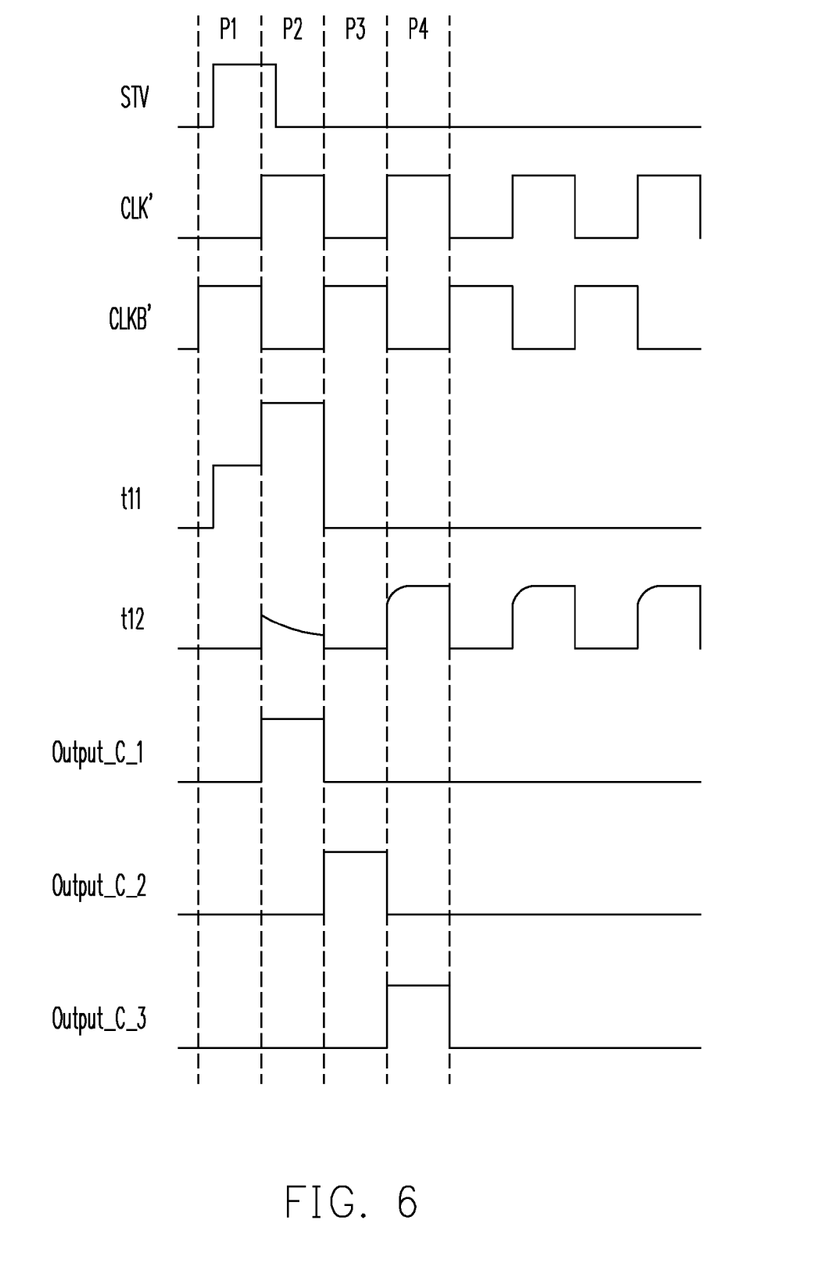
FIG. 6 illustrates schematic waveforms of each nodes of the odd-pixel gate line driving circuit implemented with the odd-pixel gate line driving circuit shown in FIG. 4.

FIG. 6 illustrates schematic waveforms of each nodes of the odd-pixel gate line driving circuit C_1 implemented with the odd-pixel gate line driving circuit C_Odd shown in FIG. 4. The operation of the odd-pixel gate line driving circuit C_Odd shown in FIG. 4 is described according to FIG. 6 as follows. It should be noted that, the level of the positive clock signal input end CLK' is synchronic with that of the positive clock signal input source CLK, and the level of the negative clock signal input end CLKB' is synchronic with that of the negative clock signal input source CLKB. The levels Output_C_1, Output_C_2, and Output_C_3 respectively correspond to the levels of the signal output ends of the gate line driving circuits C_1, C_2, and C_3.

First of all, the signal input source STV used to start the gate line driving module 300 has the high level during the period P1 shown in FIG. 6 because it is triggered at start. Accordingly, the 1st N-type TFT M1 is turned on, and the level of the node t11 shown in FIG. 4 is raised up by a specific degree as shown in FIG. 6. The raised level of the node t11 during the period P1 approximates to the high level of the positive clock signal source CLK or the negative clock signal source CLKB. Next, the 6th N-type TFT M6 is turned on by the high level of the node t11, and further, because the 8th N-type TFT M8 is turned on by the high level of the negative clock signal end CLKB', the level of the signal output end Output approximates to the low level of the positive clock signal end CLK' or the low level gate power source VGL in the meanwhile, so as to form the low level of the level Output_C_1 shown in FIG. 6 during the period P1.

Thereafter, when the timing goes into the period P2, and the signal input source STV becomes low, the positive clock signal end CLK' becomes high, and the negative clock signal end CLKB' becomes low, such that the 5th N-type TFT M5 and the 8th N-type TFT M8 are turned off, and the 3rd N-type TFT M3 is turned on. At this time, because the voltage difference between the gate and the source of the 6th N-type TFT M6 is stored in the capacitor C1, the level of the node t11 is raised up again during the period P2 as shown in FIG. 6, and the raised level of the node t11 is substantially equal to two times of the high level of the positive clock signal input end CLK' or the negative clock signal input end CLKB'. Because the positive clock signal input end CLK' becomes high, and the 6th N-type TFT M6 is still turned on, the signal output end Output is also raised from the low level to the high level. In order to avoid the level of the signal output end Output falling down during the period P2, the 2nd N-type TFT M2 and the 7th N-type TFT M7 are necessarily turned off at this time. That is, maintaining the node t2 at the low level is necessary. However, because the 3rd N-type TFT M3 is turned on by the positive clock signal end CLK' with the high level, and the 4th N-type TFT M4 is turned on by the signal output end Output with the high level through the gate of the 4th N-type TFT M4, a higher duty is necessary for the 4th N-type TFT M4 at this time to pull down the level of the node t12 as far as possible. Accordingly, regarding the design of the circuit in the embodiment of the disclosure, a width to length (W/L) ratio of the 4$^{th}$ N-type TFT M4 is relatively greater than that of the 3$^{rd}$ N-type TFT M3, such that a large amount of current flows through the 4$^{th}$ N-type TFT M4, and thus, the level of the node t12 is pulled down. Accordingly, the 2$^{nd}$ N-type TFT M2 and the 7$^{th}$ N-type TFT M7 are turned off, and further, the path of which the level of the signal output end Output is pulled down is cut off.

During the period P3, the positive clock signal end CLK' becomes low again, and the negative clock signal end CLKB' becomes high again, such that the 5$^{th}$ N-type TFT M5 is turned on. In the meanwhile, the 8$^{th}$ N-type TFT M8 is turned on, such that the level of the signal output end Output is pulled down. The signal feedback end FB receives an output signal with the high level transmitted by the even-pixel gate line driving circuit of the next stage, and the level of the node t12 is pulled up through the 5$^{th}$ N-type TFT M5 which is turned on, such that the 2$^{nd}$ N-type TFT M2 and the 7$^{th}$ N-type TFT M7 are turned on, and the levels of the node t11 and the signal output end Output are pulled down in the meanwhile. Accordingly, a cycle has been finished. Because the 1$^{st}$ N-type TFT M1 does not receives the signal with the high level transmitted from the signal input end FA and is not turned on, the level of the signal output end Output does not return to the high level during the period P2 again.

The operations of the even-pixel gate line driving circuit C_Even shown in FIG. 5 and the odd-pixel gate line driving circuit C_Odd shown in FIG. 4 are similar. The difference thereof simply lies in that the positions coupled to the positive clock signal end CLK' and the negative clock signal end CLKB' are exactly opposite, and the operation of the even-pixel gate line driving circuit C_Even shown in FIG. 5 will be simply described as follows, and the same portion which has been described in the foregoing embodiment will not be repeated herein. It is assumed that during the period P2 shown in FIG. 6, the signal input end FA receives the output signal transmitted from the odd-pixel gate line driving circuit of the previous stage, so as to turn on the 9$^{th}$ N-type TFT M9. Accordingly, the level of the node t11 shown in FIG. 5 is raised up. Next, the 14$^{th}$ N-type TFT M11 is turned on by the high level of the node t11, and further, because the 16$^{th}$ N-type TFT M16 is turned on by the high level of the positive clock signal end CLK', the level of the signal output end Output approximates to the low level of the negative clock signal end CLKB' or the low level gate power source VGL in the meanwhile.

Thereafter, when the timing goes into the period P3, and the signal input end FA becomes low, the positive clock signal end CLK' becomes low, and the negative clock signal end CLKB' becomes high, such that the 13$^{th}$ N-type TFT M13 and the 16$^{th}$ N-type TFT M16 are turned off, and the 11$^{th}$ N-type TFT M11 is turned on. At this time, because the voltage difference between the gate and the source of the 14$^{th}$ N-type TFT M14 is stored in the capacitor C2, the level of the node t11 is raised up again, and the raised level of the node t11 is also substantially equal to two times of the high level of the positive clock signal input end CLK' or the negative clock signal input end CLKB'. Because the negative clock signal input end CLKB' becomes high, and the 14$^{th}$ N-type TFT M14 is still turned on, the signal output end Output is also raised from the low level to the high level. In order to avoid the level of the signal output end Output falling down during the period P3, the 10$^{th}$ N-type TFT M10 and the 15$^{th}$ N-type TFT M15 are necessarily turned off at this time. That is, maintaining the node 12 at the low level is necessary. However, because the 11$^{th}$ N-type TFT M11 is turned on by the negative clock signal end CLKB' with the high level, and the 12$^{th}$ N-type TFT M12 is turned on by the signal output end Output with the high level through the gate of the 12$^{th}$ N-type TFT M12, a higher duty is necessary for the 12$^{th}$ N-type TFT M12 at this time to pull down the level of the node t12 as far as possible. Accordingly, a W/L ratio of the 12$^{th}$ N-type TFT M12 is relatively greater than that of the 11$^{th}$ N-type TFT M11, such that a large amount of current flows through the 12$^{th}$ N-type TFT M12, and thus, the level of the node t12 is pulled down. Accordingly, the 10$^{th}$ N-type TFT M10 and the 15$^{th}$ N-type TFT M15 are turned off, and further, the path of which the level of the signal output end Output is pulled down is cut off.

During the period P4, the positive clock signal end CLK' becomes high again, and the negative clock signal end CLKB' becomes low again, such that the 13$^{th}$ N-type TFT M13 is turned on. In the meanwhile, the 16$^{th}$ N-type TFT M16 is turned on, such that the level of the signal output end Output is pulled down. The signal feedback end FB receives an output signal with the high level transmitted by the odd-pixel gate line driving circuit of the next stage, and the level of the node t12 is pulled up through the 13$^{th}$ N-type TFT M13 which is turned on, such that the 10$^{th}$ N-type TFT M10 and the 15$^{th}$ N-type TFT M15 are turned on, and the levels of the node t11 and the signal output end Output are pulled down in the meanwhile. Accordingly, a cycle has been finished. Because the 9$^{th}$ N-type TFT M9 does not receives the signal with the high level transmitted from the signal input end FA and is not turned on, the level of the signal output end Output does not return to the high level again.

The foregoing operations of the gate line driving circuits shown in FIG. 4 and FIG. 6 proceed in each odd-pixel gate line driving circuit and each even-pixel gate line driving circuit of the gate line driving module 300 in an iterative manner to drive the corresponding gate lines until the gate lines corresponding to the gate line driving circuits are all driven at a time. It should be noted that, when the foregoing iteration proceeds to the auxiliary gate line driving circuit 350, the auxiliary gate line driving circuit 350 forwards the output signal thereof to the signal input end FA of the 1$^{st}$ stage gate line driving circuit C_1 again to restart the cycle.

As known from the schematic waveforms shown in FIG. 6, among any of the odd-pixel gate line driving circuit C_Odd or the even-pixel gate line driving circuit C_Even of the gate line driving module 300 or the auxiliary gate line driving circuit 350, no N-type TFT continuously stays in the state of being turned on. Accordingly, the device characteristic drift due to N-type TFTs continuously biased in the foregoing related art is not generated, such that the disadvantage is overcome. Besides, in the foregoing related art, each gate line driving circuit adopts about more than 13 transistors as elements. However, in the exemplary embodiments of the disclosure, each gate line driving circuit simply adopts 8 transistors and 1 capacitor. Accordingly, the effect of reducing area is achieved regarding the integration of the LC panel and the gate line driving circuit. Furthermore, in the exemplary embodiments of the disclosure, each gate line driving circuit of the gate line driving module adopts the clock signal sources as the power source thereof, such that it is unnecessary to adopt the high level gate power source which continuously supplies the electric power in the foregoing related art.

In summary, the disclosure has met the patentability requirements stipulated in the Patent Act, and this application is being filed in accordance with relevant regulations. The embodiments described hereinbefore are chosen and described in order to best explain the principles of the disclosure and its best mode practical application. It is not intended to be exhaustive to limit the disclosure to the precise form or to the exemplary embodiments disclosed. Namely, persons skilled in the art are enabled to understand the disclosure through various embodiments with various modifications as are suited to the particular use or implementation contemplated. It is intended that the scope of the disclosure be defined by the claims appended hereto and their equivalents in which all terms are meant in their broadest reasonable sense unless otherwise indicated.

What is claimed is:

1. A gate line driving module for a liquid crystal display, the gate line driving module comprising:
   a plurality of odd-pixel gate line driving circuits;
   a plurality of even-pixel gate line driving circuits; and
   an auxiliary gate line driving circuit;
   wherein a signal input source is coupled to a signal input end of a first-stage odd-pixel gate line driving circuit of the odd-pixel gate line driving circuits or a signal input end of a first-stage even-pixel gate line driving circuit of the even-pixel gate line driving circuits, and the signal input source is also coupled to a signal feedback end of the auxiliary gate line driving circuit;
   wherein a first clock signal source is coupled to a first clock signal input end of each of the odd-pixel gate line driving circuits, a first clock signal input end of each of the even-pixel gate line driving circuits, and a first clock signal input end of the auxiliary gate line driving circuit, and a second clock signal source is coupled to a second clock signal input end of each of the odd-pixel gate line driving circuits, a second clock signal input end of each of the even-pixel gate line driving circuits, and a second clock signal input end of the auxiliary gate line driving circuit, the first clock signal source and the second clock signal source are inverted from each other, and the first clock signal source and the second clock signal source serve as a high level gate power source of the odd-pixel gate line driving circuits, the even-pixel gate line driving circuits, or the auxiliary gate line driving circuit;
   wherein transistors of the odd-pixel gate line driving circuits, the even-pixel gate line driving circuits, and the auxiliary gate line driving circuit are N-type thin film transistors;
   wherein the gate line driving module is fabricated with a liquid crystal panel of the liquid crystal display in an identical amorphous silicon process, and
   wherein each of the odd-pixel gate line driving circuits comprises: a $1^{st}$ N-type TFT and a $2^{nd}$ N-type TFT, a drain of the $1^{st}$ N-type TFT and a drain of the $2^{nd}$ N-type TFT are directly connected to a signal output end of each of the odd-pixel gate line driving circuits, a source of the $1^{st}$ N-type TFT and a source of the $2^{nd}$ N-type TFT are both directly connected to a low level gate power source input end of each of the odd-pixel gate line driving circuits, and the $1^{st}$ N-type TFT and the $2^{nd}$ N-type TFT are turned on alternatively;
   wherein a low level gate power source is coupled to the low level gate power source input end of each of the odd-pixel gate line driving circuits, a low level gate power source input end of each of the even-pixel gate line driving circuits, and a low level gate power source input end of the auxiliary gate line driving circuit;
   wherein the signal output end of each of the odd-pixel gate line driving circuits is coupled to a signal input end of the even-pixel gate line driving circuit of a next stage of the odd-pixel gate line driving circuit or a signal input end of the auxiliary gate line driving circuit, and a signal output end of each of the even-pixel gate line driving circuits is coupled to a signal input end of the odd-pixel gate line driving circuit of a next stage of the even-pixel gate line driving circuit or the signal input end of the auxiliary gate line driving circuit;
   wherein the signal output end of each of the odd-pixel gate line driving circuits is coupled to a signal feedback end of the even-pixel gate line driving circuit of a previous stage of the odd-pixel gate line driving circuit, and the signal output end of each of the even-pixel gate line driving circuits is coupled to a signal feedback end of the odd-pixel gate line driving circuit of a previous stage of the even-pixel gate line driving circuit;
   wherein each of the odd-pixel gate line driving circuits further comprises:
   a $3^{rd}$ N-type TFT, wherein a gate of the $3^{rd}$ N-type TFT is coupled to a drain of the $3^{rd}$ N-type TFT;
   a $4^{th}$ N-type TFT, wherein a drain of the $4^{th}$ N-type TFT is coupled to a source of the $3^{rd}$ N-type TFT;
   a $5^{th}$ N-type TFT, wherein a gate of the $5^{th}$ N-type TFT is coupled to a drain of the $5^{th}$ N-type TFT, and a source of the $5^{th}$ N-type TFT is coupled to a gate of the $4^{th}$ N-type TFT;
   a $6^{th}$ N-type TFT, wherein a drain of the $6^{th}$ N-type TFT is coupled to the source of the $5^{th}$ N-type TFT;
   a $7^{th}$ N-type TFT, wherein a source of the $7^{th}$ N-type TFT is coupled to the gate of the $4^{th}$ N-type TFT;
   an $8^{th}$ N-type TFT, wherein a gate of the $8^{th}$ N-type TFT is coupled to the source of the $3^{rd}$ N-type TFT, and a source of the $8^{th}$ N-type TFT is coupled to a gate of the $6^{th}$ N-type TFT; and
   a capacitor, wherein a first end of the capacitor is coupled to the gate of the $8^{th}$ N-type TFT, and a second end of the capacitor is coupled to the source of the $8^{th}$ N-type TFT;
   wherein a gate of the $1^{st}$ N-type TFT is coupled to the gate of the $4^{th}$ N-type TFT, and a drain of the $1^{st}$ N-type TFT is coupled to the source of the $8^{th}$ N-type TFT;
   wherein a drain of the $2^{nd}$ N-type TFT is coupled to the source of the $8^{th}$ N-type TFT; and
   wherein a width to length (W/L) ratio of the $6^{th}$ N-type TFT is greater than a W/L ration of the $5^{th}$ N-type TFT.

2. The gate line driving module as claimed in claim 1, wherein the signal input end of the first-stage odd-pixel gate line driving circuit is coupled to the drain of the $3^{rd}$ N-type TFT of the first-stage odd-pixel gate line driving circuit;
   wherein the first clock signal input end is coupled to the drain of the $5^{th}$ N-type TFT and a drain of the $8^{th}$ N-type TFT, and the second clock signal input end is coupled to a gate of the $7^{th}$ N-type TFT and a gate of the $2^{nd}$ N-type TFT;
   wherein the low level gate power source input end is coupled to a source of the $4^{th}$ N-type TFT and a source of the $6^{th}$ N-type TFT;
   wherein the signal feedback end of each of the odd-pixel gate line driving circuits is coupled to a drain of the $7^{th}$ N-type TFT.

3. The gate line driving module as claimed in claim 1, wherein the signal input end of the first-stage odd-pixel gate line driving circuit is coupled to the drain of the $3^{rd}$ N-type TFT of the first-stage odd-pixel gate line driving circuit;
   wherein the first clock signal input end is coupled to a gate of the $7^{th}$ N-type TFT and a gate of the $2^{nd}$ N-type TFT, and the second clock signal input end is coupled to the drain of the $5^{th}$ N-type TFT and a drain of the $8^{th}$ N-type TFT;

wherein the low level gate power source input end is coupled to a source of the 4$^{th}$ N-type TFT, a source of the 6$^{th}$ N-type TFT, a source of the 1$^{st}$ N-type TFT, and a source of the 2$^{nd}$ N-type TFT;

wherein the signal feedback end of each of the odd-pixel gate line driving circuits is coupled to a drain of the 7$^{th}$ N-type TFT.

4. The gate line driving module as claimed in claim 1, wherein each of the even-pixel gate line driving circuits comprises:

a 9$^{th}$ N-type TFT, wherein a gate of the 9$^{th}$ N-type TFT is coupled to a drain of the 9$^{th}$ N-type TFT;

a 10$^{th}$ N-type TFT, wherein a drain of the 10$^{th}$ N-type TFT is coupled to a source of the 9$^{th}$ N-type TFT;

a 11$^{th}$ N-type TFT, wherein a gate of the 11$^{th}$ N-type TFT is coupled to a drain of the 11$^{th}$ N-type TFT, and a source of the 11$^{th}$ N-type TFT is coupled to a gate of the 10$^{th}$ N-type TFT;

a 12$^{th}$ N-type TFT, wherein a drain of the 12$^{th}$ N-type TFT is coupled to the source of the 11$^{th}$ N-type TFT;

a 13$^{th}$ N-type TFT, wherein a source of the 13$^{th}$ N-type TFT is coupled to the gate of the 10$^{th}$ N-type TFT;

a 14$^{th}$ N-type TFT, wherein a gate of the 14$^{th}$ N-type TFT is coupled to the source of the 9$^{th}$ N-type TFT, and a source of the 14$^{th}$ N-type TFT is coupled to a gate of the 12$^{th}$ N-type TFT;

a 15$^{th}$ N-type TFT, wherein a gate of the 15$^{th}$ N-type TFT is coupled to the gate of the 10$^{th}$ N-type TFT, and a drain of the 15$^{th}$ N-type TFT is coupled to the source of the 14$^{th}$ N-type TFT;

a 16$^{th}$ N-type TFT, wherein a drain of the 16$^{th}$ N-type TFT is coupled to the source of the 14$^{th}$ N-type TFT; and a capacitor, wherein a first end of the capacitor is coupled to the gate of the 14$^{th}$ N-type TFT, and a second end of the capacitor is coupled to the source of the 14$^{th}$ N-type TFT;

wherein a W/L ratio of the 12$^{th}$ N-type TFT is greater than a W/L ration of the 11$^{th}$ N-type TFT.

5. The gate line driving module as claimed in claim 4, wherein the signal input end of the first-stage even-pixel gate line driving circuit is coupled to the drain of the 9$^{th}$ N-type TFT of the first-stage even-pixel gate line driving circuit;

wherein the first clock signal input end is coupled to the drain of the 11$^{th}$ N-type TFT and a drain of the 14$^{th}$ N-type TFT, and the second clock signal input end is coupled to a gate of the 13$^{th}$ N-type TFT and a gate of the 16$^{th}$ N-type TFT;

wherein the low level gate power source input end is coupled to a source of the 10$^{th}$ N-type TFT, a source of the 12$^{th}$ N-type TFT, a source of the 15$^{th}$ N-type TFT, and a source of the 16$^{th}$ N-type TFT;

wherein the signal output end of each of the even-pixel gate line driving circuits is coupled to the drain of the 16$^{th}$ N-type TFT;

wherein the signal feedback end of each of the even-pixel gate line driving circuits is coupled to a drain of the 13$^{th}$ N-type TFT.

6. The gate line driving module as claimed in claim 4, wherein the signal input end of the first-stage even-pixel gate line driving circuit is coupled to the drain of the 9$^{th}$ N-type TFT of the first-stage even-pixel gate line driving circuit;

wherein the first clock signal input end is coupled to a gate of the 13$^{th}$ N-type TFT and a gate of the 16$^{th}$ N-type TFT, and the second clock signal input end is coupled to the drain of the 11$^{th}$ N-type TFT and a drain of the 14$^{th}$ N-type TFT;

wherein the low level gate power source input end is coupled to a source of the 10$^{th}$ N-type TFT, a source of the 12$^{th}$ N-type TFT, a source of the 15$^{th}$ N-type TFT, and a source of the 16$^{th}$ N-type TFT;

wherein the signal output end of each of the even-pixel gate line driving circuits is coupled to the drain of the 16$^{th}$ N-type TFT;

wherein the signal feedback end of each of the even-pixel gate line driving circuits is coupled to a drain of the 13$^{th}$ N-type TFT.

7. The gate line driving module as claimed in claim 1, wherein the auxiliary gate line driving circuit comprises:

a 17$^{th}$ N-type TFT, wherein a gate of the 17$^{th}$ N-type TFT is coupled to a drain of the 17$^{th}$ N-type TFT;

a 18$^{th}$ N-type TFT, wherein a drain of the 18$^{th}$ N-type TFT is coupled to a source of the 17$^{th}$ N-type TFT;

a 19$^{th}$ N-type TFT, wherein a gate of the 19$^{th}$ N-type TFT is coupled to a drain of the 19$^{th}$ N-type TFT, and a source of the 19$^{th}$ N-type TFT is coupled to a gate of the 18$^{th}$ N-type TFT;

a 20$^{th}$ N-type TFT, wherein a drain of the 20$^{th}$ N-type TFT is coupled to the source of the 19$^{th}$ N-type TFT;

a 21$^{th}$ N-type TFT, wherein a source of the 21$^{th}$ N-type TFT is coupled to the gate of the 18$^{th}$ N-type TFT;

a 22$^{th}$ N-type TFT, wherein a gate of the 22$^{th}$ N-type TFT is coupled to the source of the 17$^{th}$ N-type TFT, and a source of the 22$^{th}$ N-type TFT is coupled to a gate of the 20$^{th}$ N-type TFT;

a 23$^{th}$ N-type TFT, wherein a gate of the 23$^{th}$ N-type TFT is coupled to the gate of the 18$^{th}$ N-type TFT, and a drain of the 23$^{th}$ N-type TFT is coupled to the source of the 22$^{th}$ N-type TFT;

a 24$^{th}$ N-type TFT, wherein a drain of the 24$^{th}$ N-type TFT is coupled to the source of the 22$^{th}$ N-type TFT; and a capacitor, wherein a first end of the capacitor is coupled to the gate of the 22$^{th}$ N-type TFT, and a second end of the capacitor is coupled to the source of the 22$^{th}$ N-type TFT;

wherein a W/L ratio of the 20$^{th}$ N-type TFT is greater than a W/L ration of the 19$^{th}$ N-type TFT.

8. The gate line driving module as claimed in claim 7, wherein the first clock signal input end is coupled to the drain of the 19$^{th}$ N-type TFT and a drain of the 22$^{th}$ N-type TFT, and the second clock signal input end is coupled to a gate of the 21$^{th}$ N-type TFT and a gate of the 24$^{th}$ N-type TFT;

wherein the low level gate power source input end is coupled to a source of the 18$^{th}$ N-type TFT, the source of the 20$^{th}$ N-type TFT, a source of the 23$^{th}$ N-type TFT, and a source of the 24$^{th}$ N-type TFT;

wherein the signal output end of the auxiliary gate line driving circuit is coupled to the drain of the 24$^{th}$ N-type TFT;

wherein the signal feedback end of the auxiliary gate line driving circuit is coupled to a drain of the 21$^{th}$ N-type TFT.

9. The gate line driving module as claimed in claim 7, wherein the first clock signal input end is coupled to a gate of the 21$^{th}$ N-type TFT and a gate of the 24$^{th}$ N-type TFT, and the second clock signal input end is coupled to the drain of the 19$^{th}$ N-type TFT and a drain of the 22$^{th}$ N-type TFT;

wherein the low level gate power source input end is coupled to a source of the 18$^{th}$ N-type TFT, the source of the 20$^{th}$ N-type TFT, a source of the 23$^{th}$ N-type TFT, and a source of the 24$^{th}$ N-type TFT;

wherein the signal output end of the auxiliary gate line driving circuit is coupled to the drain of the 24$^{th}$ N-type TFT;

wherein the signal feedback end of the auxiliary gate line driving circuit is coupled to a drain of the 21$^{th}$ N-type TFT.

10. A liquid crystal display, comprising:
a plurality of data line driving circuits; and
a liquid crystal panel module, comprising:
an liquid crystal panel; and
a gate line driving module, comprising:
a plurality of odd-pixel gate line driving circuits;
a plurality of even-pixel gate line driving circuits; and
an auxiliary gate line driving circuit;
wherein the gate line driving module and the data line driving circuits drive corresponding thin film transistors on the liquid crystal panel;
wherein a signal input source is coupled to a signal input end of a first-stage odd-pixel gate line driving circuit of the odd-pixel gate line driving circuits or a signal input end of a first-stage even-pixel gate line driving circuit of the even-pixel gate line driving circuits, and the signal input source is also coupled to a signal feedback end of the auxiliary gate line driving circuit;
wherein a first clock signal source is coupled to a first clock signal input end of each of the odd-pixel gate line driving circuits, a first clock signal input end of each of the even-pixel gate line driving circuits, and a first clock signal input end of the auxiliary gate line driving circuit, and a second clock signal source is coupled to a second clock signal input end of each of the odd-pixel gate line driving circuits, a second clock signal input end of each of the even-pixel gate line driving circuits, and a second clock signal input end of the auxiliary gate line driving circuit, the first clock signal source and the second clock signal source are inverted from each other, and the first clock signal source and the second clock signal source serve as a high level gate power source of the odd-pixel gate line driving circuits, the even-pixel gate line driving circuits, or the auxiliary gate line driving circuit;
wherein transistors of the odd-pixel gate line driving circuits, the even-pixel gate line driving circuits, and the auxiliary gate line driving circuit are N-type thin film transistors;
wherein the gate line driving module is fabricated with a liquid crystal panel of the liquid crystal display in an identical amorphous silicon process; and
wherein each of the odd-pixel gate line driving circuits comprises: a 1$^{st}$ N-type TFT and a 2$^{nd}$ N-type TFT, a drain of the 1$^{st}$ N-type TFT and a drain of the 2$^{nd}$ N-type TFT are directly connected to a signal output end of each of the odd-pixel gate line driving circuits, a source of the 1$^{st}$ N-type TFT and a source of the 2$^{nd}$ N-type TFT are both directly connected to a low level gate power source input end of each of the odd-pixel gate line driving circuits, and the 1$^{st}$ N-type TFT and the 2$^{nd}$ N-type TFT are turned on alternatively;
wherein a low level gate power source is coupled to the low level gate power source input end of each of the odd-pixel gate line driving circuits, a low level gate power source input end of each of the even-pixel gate line driving circuits, and a low level gate power source input end of the auxiliary gate line driving circuit;
wherein the signal output end of each of the odd-pixel gate line driving circuits is coupled to a signal input end of the even-pixel gate line driving circuit of which a stage is next to that of the odd-pixel gate line driving circuit or a signal input end of the auxiliary gate line driving circuit, and a signal output end of each of the even-pixel gate line driving circuits is coupled to a signal input end of the odd-pixel gate line driving circuit of which a stage is next to that of the even-pixel gate line driving circuit or the signal input end of the auxiliary gate line driving circuit;
wherein the signal output end of each of the odd-pixel gate line driving circuits is coupled to a signal feedback end of the even-pixel gate line driving circuit of a previous stage of the odd-pixel gate line driving circuit, and the signal output end of each of the even-pixel gate line driving circuits is coupled to a signal feedback end of the odd-pixel gate line driving circuit of a previous stage of the even-pixel gate line driving circuit;
wherein each of the odd-pixel gate line driving circuits further comprises:
a 3$^{rd}$ N-type TFT, wherein a gate of the 3$^{rd}$ N-type TFT is coupled to a drain of the 3$^{rd}$ N-type TFT;
a 4$^{th}$ N-type TFT, wherein a drain of the 4$^{th}$ N-type TFT is coupled to a source of the 3$^{rd}$ N-type TFT;
a 5$^{th}$ N-type TFT, wherein a gate of the 5$^{th}$ N-type TFT is coupled to a drain of the 5$^{th}$ N-type TFT, and a source of the 5$^{th}$ N-type TFT is coupled to a gate of the 4$^{th}$ N-type TFT;
a 6$^{th}$ N-type TFT, wherein a drain of the 6$^{th}$ N-type TFT is coupled to the source of the 5$^{th}$ N-type TFT;
a 7$^{th}$ N-type TFT, wherein a source of the 7$^{th}$ N-type TFT is coupled to the gate of the 4$^{th}$ N-type TFT;
an 8$^{th}$ N-type TFT, wherein a gate of the 8$^{th}$ N-type TFT is coupled to the source of the 3$^{rd}$ N-type TFT, and a source of the 8$^{th}$ N-type TFT is coupled to a gate of the 6$^{th}$ N-type TFT; and
a capacitor, wherein a first end of the capacitor is coupled to the gate of the 8$^{th}$ N-type TFT, and a second end of the capacitor is coupled to the source of the 8$^{th}$ N-type TFT;
wherein a gate of the 1$^{st}$ N-type TFT is coupled to the gate of the 4$^{th}$ N-type TFT, and a drain of the 1$^{st}$ N-type TFT is coupled to the source of the 8$^{th}$ N-type TFT;
wherein a drain of the 2$^{nd}$ N-type TFT is coupled to the source of the 8$^{th}$ N-type TFT; and
wherein a width to length (W/L) ratio of the 6$^{th}$ N-type TFT is greater than a W/L ration of the 5$^{th}$ N-type TFT.

11. The liquid crystal display as claimed in claim 10,
wherein the signal input end of the first-stage odd-pixel gate line driving circuit is coupled to the drain of the 3$^{rd}$ N-type TFT of the first-stage odd-pixel gate line driving circuit;
wherein the first clock signal input end is coupled to the drain of the 5$^{th}$ N-type TFT and a drain of the 8$^{th}$ N-type TFT, and the second clock signal input end is coupled to a gate of the 7$^{th}$ N-type TFT and a gate of the 2$^{nd}$ N-type TFT;
wherein the low level gate power source input end is coupled to a source of the 4$^{th}$ N-type TFT and a source of the 6$^{th}$ N-type TFT;
wherein the signal feedback end of each of the odd-pixel gate line driving circuits is coupled to a drain of the 7$^{th}$ N-type TFT.

12. The liquid crystal display as claimed in claim 10,
wherein the signal input end of the first-stage odd-pixel gate line driving circuit is coupled to the drain of the 3$^{rd}$ N-type TFT of the first-stage odd-pixel gate line driving circuit;

wherein the first clock signal input end is coupled to a gate of the 7$^{th}$ N-type TFT and a gate of the 2$^{nd}$ N-type TFT, and the second clock signal input end is coupled to the drain of the 5$^{th}$ N-type TFT and a drain of the 8$^{th}$ N-type TFT;

wherein the low level gate power source input end is coupled to a source of the 4$^{th}$ N-type TFT, a source of the 6$^{th}$ N-type TFT, a source of the 1$^{st}$ N-type TFT, and a source of the 2$^{nd}$ N-type TFT;

wherein the signal feedback end of each of the odd-pixel gate line driving circuits is coupled to a drain of the 7$^{th}$ N-type TFT.

13. The liquid crystal display as claimed in claim 10, wherein each of the even-pixel gate line driving circuits comprises:

a 9$^{th}$ N-type TFT, wherein a gate of the 9$^{th}$ N-type TFT is coupled to a drain of the 9$^{th}$ N-type TFT;

a 10$^{th}$ N-type TFT, wherein a drain of the 10$^{th}$ N-type TFT is coupled to a source of the 9$^{th}$ N-type TFT;

a 11$^{th}$ N-type TFT, wherein a gate of the 11$^{th}$ N-type TFT is coupled to a drain of the 11$^{th}$ N-type TFT, and a source of the 11$^{th}$ N-type TFT is coupled to a gate of the 10$^{th}$ N-type TFT;

a 12$^{th}$ N-type TFT, wherein a drain of the 12$^{th}$ N-type TFT is coupled to the source of the 11$^{th}$ N-type TFT;

a 13$^{th}$ N-type TFT, wherein a source of the 13$^{th}$ N-type TFT is coupled to the gate of the 10$^{th}$ N-type TFT;

a 14$^{th}$ N-type TFT, wherein a gate of the 14$^{th}$ N-type TFT is coupled to the source of the 9$^{th}$ N-type TFT, and a source of the 14$^{th}$ N-type TFT is coupled to a gate of the 12$^{th}$ N-type TFT;

a 15$^{th}$ N-type TFT, wherein a gate of the 15$^{th}$ N-type TFT is coupled to the gate of the 10$^{th}$ N-type TFT, and a drain of the 15$^{th}$ N-type TFT is coupled to the source of the 14$^{th}$ N-type TFT;

a 16$^{th}$ N-type TFT, wherein a drain of the 16$^{th}$ N-type TFT is coupled to the source of the 14$^{th}$ N-type TFT; and a capacitor, wherein a first end of the capacitor is coupled to the gate of the 14$^{th}$ N-type TFT, and a second end of the capacitor is coupled to the source of the 14$^{th}$ N-type TFT;

wherein a W/L ratio of the 12$^{th}$ N-type TFT is greater than a W/L ration of the 11$^{th}$ N-type TFT.

14. The liquid crystal display as claimed in claim 13, wherein the signal input end of the first-stage even-pixel gate line driving circuit is coupled to the drain of the 9$^{th}$ N-type TFT of the first-stage even-pixel gate line driving circuit;

wherein the first clock signal input end is coupled to the drain of the 11$^{th}$ N-type TFT and a drain of the 14$^{th}$ N-type TFT, and the second clock signal input end is coupled to a gate of the 13$^{th}$ N-type TFT and a gate of the 16$^{th}$ N-type TFT;

wherein the low level gate power source input end is coupled to a source of the 10$^{th}$ N-type TFT, a source of the 12$^{th}$ N-type TFT, a source of the 15$^{th}$ N-type TFT, and a source of the 16$^{th}$ N-type TFT;

wherein the signal output end of each of the even-pixel gate line driving circuits is coupled to the drain of the 16$^{th}$ N-type TFT;

wherein the signal feedback end of each of the even-pixel gate line driving circuits is coupled to a drain of the 13$^{th}$ N-type TFT.

15. The liquid crystal display as claimed in claim 13, wherein the signal input end of the first-stage even-pixel gate line driving circuit is coupled to the drain of the 9$^{th}$ N-type TFT of the first-stage even-pixel gate line driving circuit;

wherein the first clock signal input end is coupled to a gate of the 13$^{th}$ N-type TFT and a gate of the 16$^{th}$ N-type TFT, and the second clock signal input end is coupled to the drain of the 11$^{th}$ N-type TFT and a drain of the 14$^{th}$ N-type TFT;

wherein the low level gate power source input end is coupled to a source of the 10$^{th}$ N-type TFT, a source of the 12$^{th}$ N-type TFT, a source of the 15$^{th}$ N-type TFT, and a source of the 16$^{th}$ N-type TFT;

wherein the signal output end of each of the even-pixel gate line driving circuits is coupled to the drain of the 16$^{th}$ N-type TFT;

wherein the signal feedback end of each of the even-pixel gate line driving circuits is coupled to a drain of the 13$^{th}$ N-type TFT.

16. The liquid crystal display as claimed in claim 10, wherein the auxiliary gate line driving circuit comprises:

a 17$^{th}$ N-type TFT, wherein a gate of the 17$^{th}$ N-type TFT is coupled to a drain of the 17$^{th}$ N-type TFT;

a 18$^{th}$ N-type TFT, wherein a drain of the 18$^{th}$ N-type TFT is coupled to a source of the 17$^{th}$ N-type TFT;

a 19$^{th}$ N-type TFT, wherein a gate of the 19$^{th}$ N-type TFT is coupled to a drain of the 19$^{th}$ N-type TFT, and a source of the 19$^{th}$ N-type TFT is coupled to a gate of the 18$^{th}$ N-type TFT;

a 20$^{th}$ N-type TFT, wherein a drain of the 20$^{th}$ N-type TFT is coupled to the source of the 19$^{th}$ N-type TFT;

a 21$^{th}$ N-type TFT, wherein a source of the 21$^{th}$ N-type TFT is coupled to the gate of the 18$^{th}$ N-type TFT;

a 22$^{th}$ N-type TFT, wherein a gate of the 22$^{th}$ N-type TFT is coupled to the source of the 17$^{th}$ N-type TFT, and a source of the 22$^{th}$ N-type TFT is coupled to a gate of the 20$^{th}$ N-type TFT;

a 23$^{th}$ N-type TFT, wherein a gate of the 23$^{th}$ N-type TFT is coupled to the gate of the 18$^{th}$ N-type TFT, and a drain of the 23$^{th}$ N-type TFT is coupled to the source of the 22$^{th}$ N-type TFT;

a 24$^{th}$ N-type TFT, wherein a drain of the 24$^{th}$ N-type TFT is coupled to the source of the 22$^{th}$ N-type TFT; and a capacitor, wherein a first end of the capacitor is coupled to the gate of the 22$^{th}$ N-type TFT, and a second end of the capacitor is coupled to the source of the 22$^{th}$ N-type TFT;

wherein a W/L ratio of the 20$^{th}$ N-type TFT is greater than a W/L ration of the 19$^{th}$ N-type TFT.

17. The liquid crystal display as claimed in claim 16, wherein the first clock signal input end is coupled to the drain of the 19$^{th}$ N-type TFT and a drain of the 22$^{th}$ N-type TFT, and the second clock signal input end is coupled to a gate of the 21$^{th}$ N-type TFT and a gate of the 24$^{th}$ N-type TFT;

wherein the low level gate power source input end is coupled to a source of the 18$^{th}$ N-type TFT, the source of the 20$^{th}$ N-type TFT, a source of the 23$^{th}$ N-type TFT, and a source of the 24$^{th}$ N-type TFT;

wherein the signal output end of the auxiliary gate line driving circuit is coupled to the drain of the 24$^{th}$ N-type TFT;

wherein the signal feedback end of the auxiliary gate line driving circuit is coupled to a drain of the 21$^{th}$ N-type TFT.

18. The liquid crystal display as claimed in claim 16,
wherein the first clock signal input end is coupled to a gate of the 21$^{th}$ N-type TFT and a gate of the 24$^{th}$ N-type TFT, and the second clock signal input end is coupled to the drain of the 19$^{th}$ N-type TFT and a drain of the 22$^{th}$ N-type TFT;
wherein the low level gate power source input end is coupled to a source of the 18$^{th}$ N-type TFT, the source of the 20$^{th}$ N-type TFT, a source of the 23$^{th}$ N-type TFT, and a source of the 24$^{th}$ N-type TFT;
wherein the signal output end of the auxiliary gate line driving circuit is coupled to the drain of the 24$^{th}$ N-type TFT;
wherein the signal feedback end of the auxiliary gate line driving circuit is coupled to a drain of the 21$^{th}$ N-type TFT.

\* \* \* \* \*